(12) United States Patent
Yagi et al.

(10) Patent No.: US 7,096,337 B2
(45) Date of Patent: *Aug. 22, 2006

(54) DISK STORAGE ACCESSING SYSTEM AND METHOD FOR CHANGING ACCESS PATH TO STORAGE DEVICES

(75) Inventors: Yuji Yagi, Yokohama (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 10/940,043

(22) Filed: Sep. 13, 2004

(65) Prior Publication Data

US 2005/0038959 A1  Feb. 17, 2005

Related U.S. Application Data (63) Continuation of application No. 10/003,095, filed on Dec. 6, 2001, now Pat. No. 6,792,503.

(30) Foreign Application Priority Data

Dec. 6, 2000  (JP) ............................. 2000-371023

(51) Int. Cl.
*G06F 13/00* (2006.01)
(52) U.S. Cl. .................................................. 711/165
(58) Field of Classification Search .................. None
See application file for complete search history.

(56) References Cited

U.S. PATENT DOCUMENTS 5,584,018 A * 12/1996 Kamiyama .................. 711/165
5,724,552 A * 3/1998 Taoda ......................... 711/165
5,893,139 A * 4/1999 Kamiyama .................. 711/117
5,956,750 A * 9/1999 Yamamoto et al. ......... 711/167
6,324,620 B1 * 11/2001 Christenson et al. ....... 711/112
6,535,954 B1 * 3/2003 Obara et al. ................ 711/114

FOREIGN PATENT DOCUMENTS

JP         03-294938       * 12/2001

* cited by examiner

*Primary Examiner*—Mano Padmanabhan
*Assistant Examiner*—Craig E Walter
(74) *Attorney, Agent, or Firm*—Townsend and Townsend and Crew LLP (57) ABSTRACT

In one embodiment of the invention, a disk storage accessing system for enabling a plurality of computers to share and access a plurality of disk storages comprises a plurality of computers that refer to the disk storages. Each of the computers includes a counting module for counting a frequency of accesses to each of the disk storages, and a module for receiving an access path change command to change access paths for the computer to access a different disk storage according to the command. The system further comprises an instructing module for collecting and totaling a frequency of accesses to each disk storage, and for instructing the receiving module of a computer that accesses the copy source disk storage after receiving a report of copy completion, to change access paths so as to access a target disk storage instead of the copy source disk storage.

8 Claims, 7 Drawing Sheets

FIG.1
DISK ACCESS MANAGEMENT SYSTEM
OVERALL BLOCK DIAGRAM

FIG.2

RESOURCE MONITORING/MANAGEMENT UNIT PROCESSING FLOW

FIG.3
SAN CONTROLLER PROCESSING FLOW

FIG.4
DKU CONTROLLER PROCESSING FLOW

FIG.5
RESOURCE MONITORING UNIT PROCESSING FLOW

FIG.6
LU CHANGE CONTROLLER

FIG.7
ACCESS FREQUENCY COUNTER PROCESSING FLOW

FIG.8

LU CHANGE TABLE OF
SAN REFERENCE COMPUTER 1

| | LU NO. | DKU NO. |
|---|---|---|
| 801 | 1 | X |
| 802 | 2 | Y |
| | ⋮ | ⋮ |

LU CHANGE TABLE OF
SAN REFERENCE COMPUTER 2

| | LU NO. | DKU NO. |
|---|---|---|
| 811 | 1 | X →Y |
| 812 | 2 | Z |
| | ⋮ | ⋮ |

FIG.9

ACCESS FREQUENCY MANAGEMENT TABLE
OF MANAGEMENT COMPUTER

| | DKU NO. | TARGET COMPUTER | ACCESS FREQUENCY |
|---|---|---|---|
| 901 | X | 1 | 0.22 |
| 902 | X | 2 | 0.50 |
| 903 | Y | 1 | 0.42 |
| 904 | Z | 2 | 0.27 |
| | ⋮ | ⋮ | |

FIG.10

ACCESS FREQUENCY DISPLAY EXAMPLE

DISK STORAGE ACCESSING SYSTEM AND METHOD FOR CHANGING ACCESS PATH TO STORAGE DEVICES

BACKGROUND OF THE INVENTION

1. Field of the Invention

The present invention relates to accesses to SAN (Storage Area Network) disk storages, more specifically to an accessing system for disk storages that disperse the access load of each of those disk storages.

2. Description of Related Art

There is a well-known method in Japanese Unexamined Patent Publication (Kokai) JP 2000-099272 for sharing disk storages among a plurality of computers connected to those storages via a dedicated network such as fiber channel.

This technique is referred to as storage area network (SAN), which assures the high freedom in assignment of disk storages and computers so that a computer can be assigned to any of necessary disk storage areas flexibly.

In recent years, information handling systems that are accessed via the Internet are considered increasingly to be important. In particular, many computer systems have come to be built as Web servers for supplying various kinds of contents.

Such a Web server often includes an unspecific number of client computers, and accordingly it is accessed so frequently that it is difficult to estimate the peak time of accesses.

Japanese Unexamined Patent Publication (Kokai) JP 10-271447 and Japanese Unexamined Patent Publication (Kokai) JP 10-069467 disclose well-known methods for dispersing accesses to such a computer system so as to solve the above problem.

The JP 10-271447 reference discloses a technique for dividing for dispersing accesses in which each content is divided into small pieces so as to be stored in a plurality of disk storages.

In this case, the access load in proportion to the number of disk storages can be dispersed, but the technique cannot cope with accesses over an estimated value.

The JP 10-069467 reference also discloses a technique for dispersing the access load with use of a plurality of server computers, but it is still difficult to disperse the load of each disk storage.

The SAN enables a plurality of computers to share a plurality of disk storages, but it cannot maintain its performance when the number of computers increases excessively, since the load of each of the shared disk storages increases.

BRIEF SUMMARY OF THE INVENTION

Under the circumstances, it is an object of the present invention to provide a method for dispersing the access load of each disk storage, which can correspond to changes of the load of a disk storage on which accesses are concentrated from a plurality of computers in the SAN.

In accordance with an aspect of the invention, a disk storage accessing system for enabling a plurality of computers to share and access a plurality of disk storages comprises a plurality of computers that refer to the disk storages. Each of the computers includes a counting module for counting a frequency of accesses to each of the disk storages, and a module for receiving an access path change command to change access paths for the computer to access a different disk storage according to the command. The system further comprises an instructing module for collecting and totaling a frequency of accesses to each disk storage, as counted by the counting module of each of the computers, as well as instructing a particular disk storage as a copy source disk storage to copy content in the copy source disk storage into one or more other disk storages as one or more target disk storages when the totaled access frequency is higher than a predetermined value, and for instructing the receiving module of a computer that accesses the copy source disk storage after receiving a report of copy completion, to change access paths so as to access a target disk storage instead of the copy source disk storage.

When instructing a computer that accesses a copy source disk to change access paths so as to access a target disk storage instead of the source disk storage, the instruction is directed to the computer that is the highest in the access frequency to the source disk storage.

When data in the copy source disk storage is updated, the updated data is copied into one or more of the target disk storages.

DETAILED DESCRIPTION OF THE PREFERRED EMBODIMENT

Hereunder, an embodiment of the present invention will be described with reference to the accompanying drawings.

Figure 1:
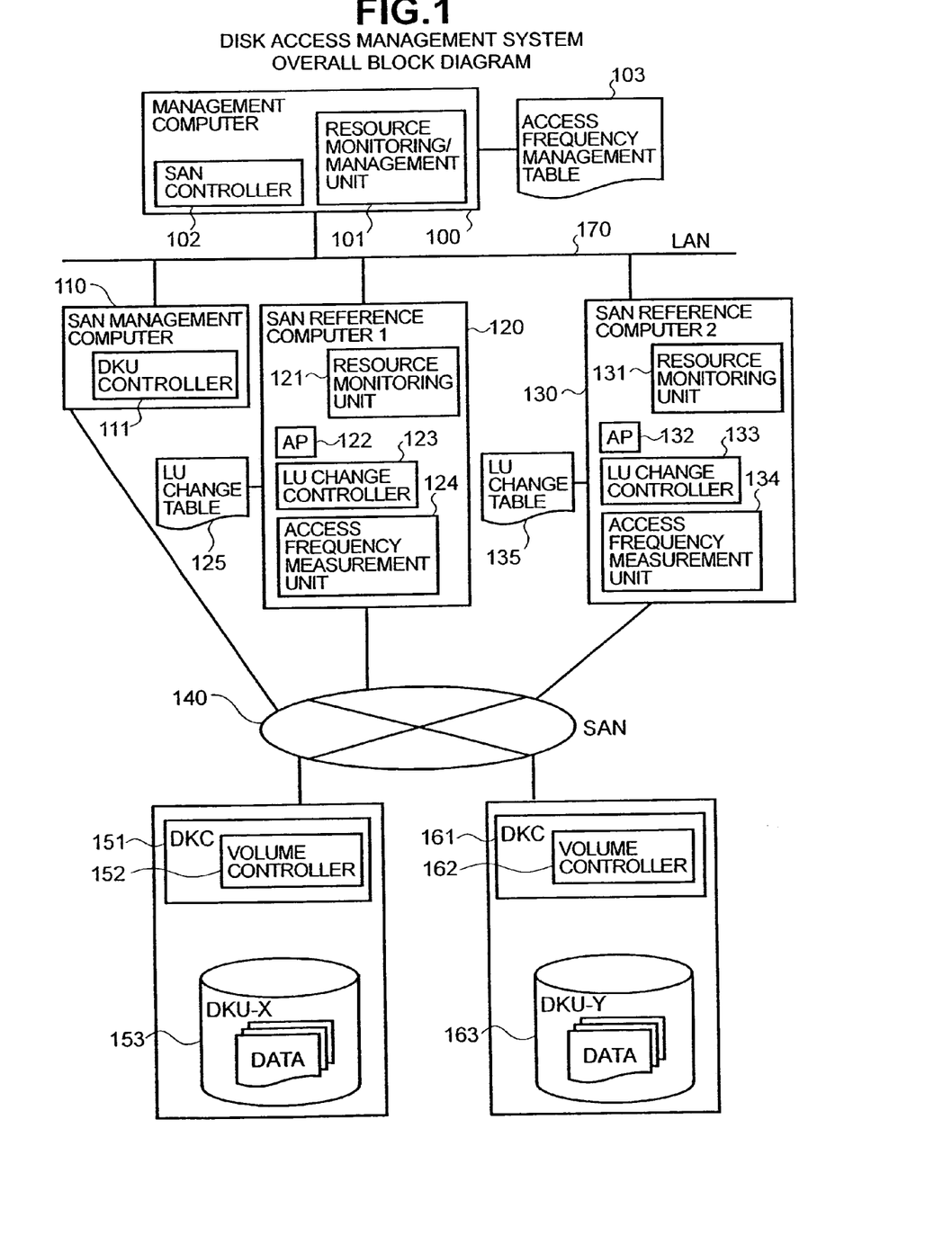
FIG. 1 is an overall block diagram of a disk access management system of the present invention.

FIG. 1 shows an overall block diagram of a disk storage access management system of the present invention.

This system is composed of a management computer (100); a SAN management computer (110) for managing a SAN (140); and a SAN reference computer 1 (120) and a SAN reference computer 2 (130) for accessing SAN disk storages respectively. The management computer (100) is connected to the SAN management computer (110), the SAN reference computer 1 (120), and the SAN reference computer 2 (130) via a LAN (170) respectively.

The system of the present invention controls accesses to each SAN (140) disk storage by enabling the management computer (100) to manage the frequency of accesses to each disk storage from each of the SAN reference computer 1 (120) and the SAN reference computer 2 (130).

The management computer (100) is provided with a resource monitoring/management unit (101) for managing the disk storage access frequency in each of the SAN reference computer 1 (120) and the SAN reference computer 2 (130), as well as an access frequency management table (103) used for managing the disk storage access frequency and a SAN controller (102) for issuing requests to the SAN. FIG. 1 shows another embodiment in which the access frequency management table (103) is not part of the management computer (100).

The SAN management computer (110) is provided with a DKU controller for instructing copying or deleting a DKU volume according to the request from the SAN controller.

Each of the SAN reference computer 1 (120) and the SAN reference computer 2 (130) is provided with an application program (122)/(132) used to access disk storages of the SAN (140); a LU (Logical Unit) change controller (123/133) used to control the disk storage access path of the application program (AP) (122/132); an LU change table (125/135) used to manage the disk storage access path; an access frequency measurement unit (124/134) used to count the frequency of accesses to each disk storage; and a resource monitoring unit (121/131) used to send the disk storage access frequency information to the resource monitoring/management unit (101). In the embodiment shown in FIG. 1, the LU change table (125/135) is separate from and does not form part of the SAN reference computer (120/130).

A plurality of disk storage units are connected to the SAN (140) and each of those disk storage units is provided with a DKC (disk storage controller) (151/161); a disk storage volume controller (152/162) used to control the disk volume (logical volume) and a disk storage unit (DKU) (153/163), which is an actual disk storage.

Figure 2:
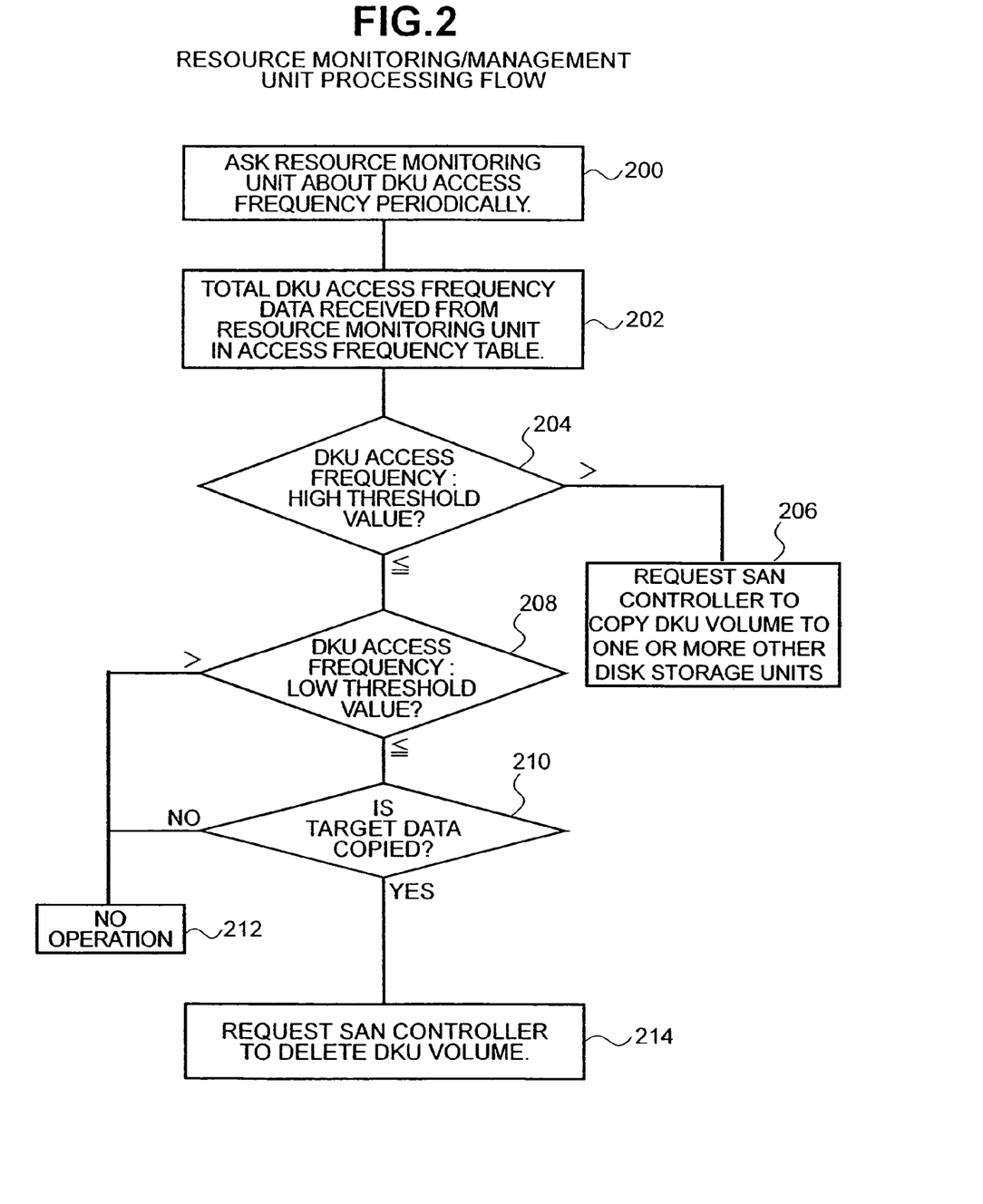
FIG. 2 is a flowchart of the processings executed by a resource monitoring/management unit of the present invention.

FIG. 2 shows a flowchart of the processings executed by the resource monitoring/management unit (101).

The resource monitoring/management unit (101) asks the resource monitoring unit (121/131) periodically about an access frequency for each disk storage unit (step 200) and totals the access frequency data of the disk storage units obtained from the resource monitoring unit (121/131) (step 202) in the access frequency management table (103).

When the access frequency of a disk storage is over a predetermined high threshold value as determined in (step 204), the resource monitoring/management unit (101) requests the SAN controller (102) to copy a disk volume into one or more other disk storage units (step 206).

When the disk storage unit access frequency is less than or equal to a predetermined low threshold value as determined in (step 208) and the target data is already copied in one or more disk storage units (step 210), the resource monitoring/management unit (101) requests the SAN controller (102) to delete the disk volume from one or more of the disk storage units (step 214).

In other cases, the resource monitoring/management unit (101) executes no operation (step 212).

Figure 3:
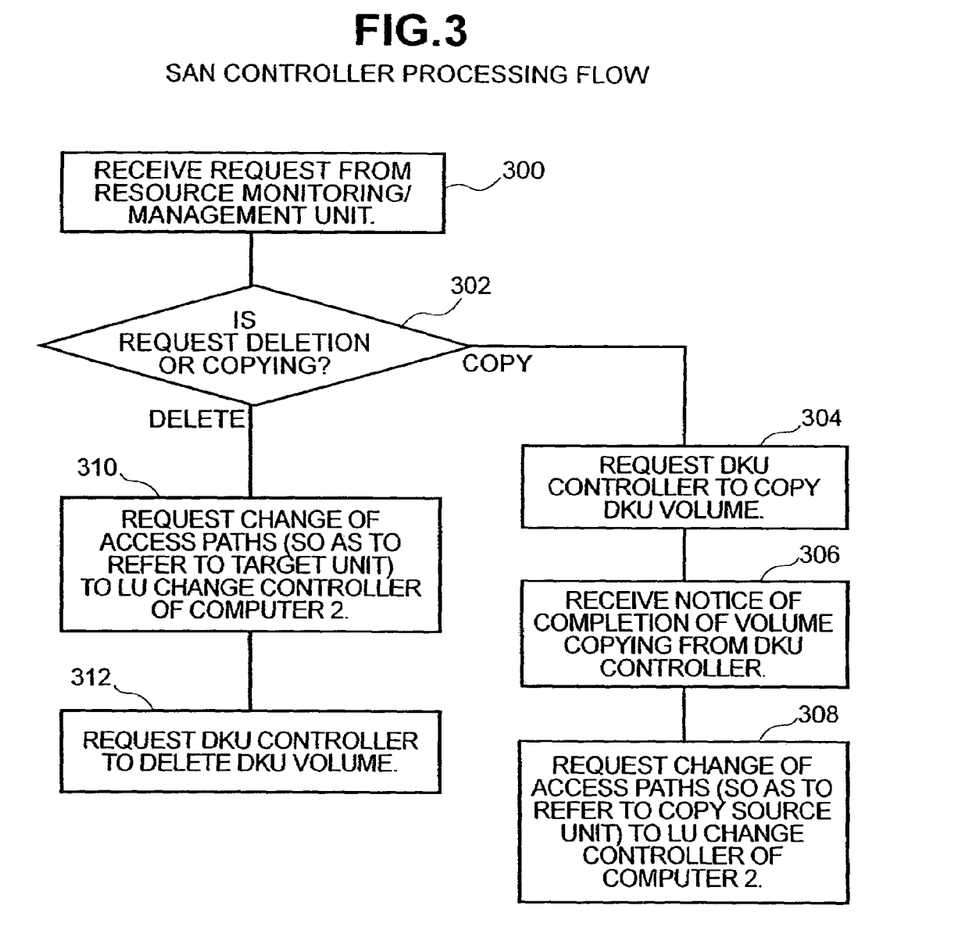
FIG. 3 is a flowchart of the processings executed by a SAN controller of the present invention.

FIG. 3 shows a flowchart of the processings executed by the SAN controller (102).

The SAN controller (102), when receiving a request from the resource monitoring/management unit (101) (step 300), determines the requested processing (step 302).

When the request is a volume copy request, the SAN controller (102) requests the DKU controller (111) to copy a disk volume into one or more other disk storage units (step 304).

Receiving a report on completion of the volume copying from the DKU controller (111) (step 306), the SAN controller (102) requests the LU change controller (135) of the SAN reference computer 2 (13) that has accessed the disk unit most frequently to change access paths so as to access the target disk storage Y instead of the copy source disk storage X (step 308).

For example, when there are three or more SAN reference computers, the access path of the SAN reference computer that has accessed the subject disk unit most frequently is changed to another so as to average the access frequencies of the paths.

When the request is a volume deletion request, the SAN controller (102) requests the LU change controller (135) of the SAN reference computer 2 (130) to change access paths so as to access the disk storage X (copy source) instead of the target disk storage Y (step 310).

After that, the SAN controller (102) requests the DKU controller (111) to delete the target disk volume (step 312).

Because a main feature of the present invention is to refer to contents in Web servers, etc., copied data in disk storages are not updated directly from any SAN reference computer.

When data in the disk storage X (copy source) is updated, the data is copied from the disk storage X (copy source) into the target disk storage Y again according to a command issued to the subject SAN management computer. When there are a plurality of target disk storages, data in the copy source disk storage X is copied again into those disk storages.

Figure 4:
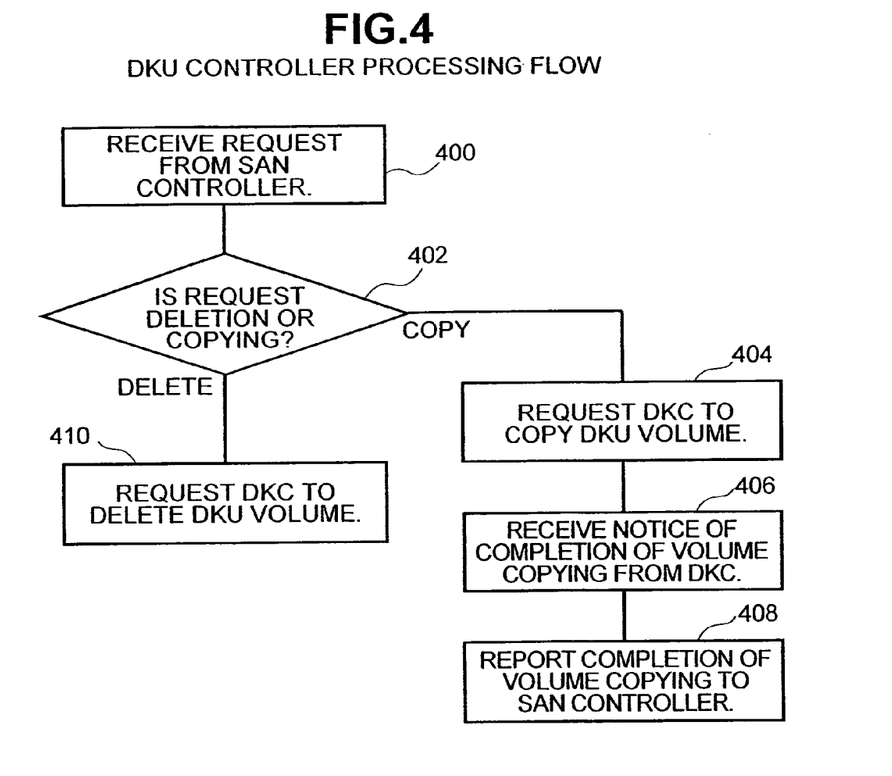
FIG. 4 is a flowchart of the processings executed by a disk storage unit (DKU) controller of the present invention.

FIG. 4 shows a flowchart of the processings executed by the DKU controller (111).

The DKU controller (111), when receiving a request from the SAN controller (102) (step 400), determines the requested processing (step 402).

When the request is a volume copy request, the DKU controller (111) issues a volume copy request to the DKC (151) (step 404).

When receiving a report on completion of the volume copying from the DKC (151) (step 406), the DKU controller (111) reports the completion of the volume copying to the SAN controller (102) that is the request source (step 408).

When the request is a volume deletion one, the DKC controller (111) issues a disk storage unit volume deletion request to the DKC (151) (step 410).

Figure 5:
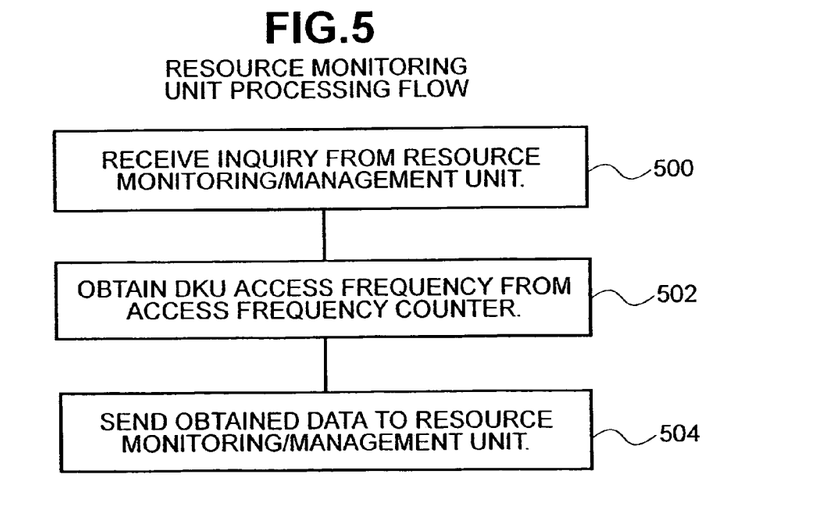
FIG. 5 is a flowchart of the processings executed by a resource monitoring unit of the present invention.

FIG. 5 shows a flowchart of the processings executed by the resource monitoring unit (121/131).

The resource monitoring unit (121/131), when receiving an inquiry from the resource monitoring/management unit (101) (step 500), obtains an access frequency of the target disk storage from the access frequency measurement unit (124/134) (step 502).

The resource monitoring unit (121/131) then sends the obtained data to the resource monitoring/management unit (101) (step 504).

Figure 6:
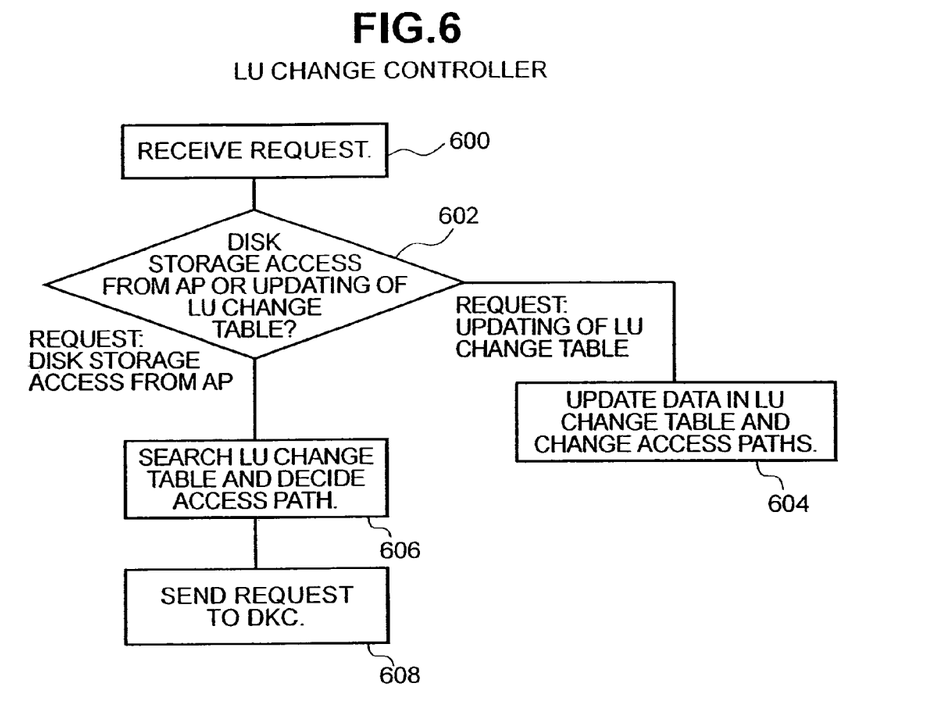
FIG. 6 is a flowchart of the processings executed by a logical unit (LU) change controller of the present invention.

FIG. 6 shows a flowchart of the processings executed by the LU change controller (123/133).

The LU change controller (123/133), when receiving a request (step 600), determines the requested processing (step 602).

When the request is an LU change table updating request, the LU change controller (123/133) updates the LU change table (125/135) and changes access paths so as to access another disk storage (step 604).

When the request is a disk storage access request from an application program, the LU change controller (123/133) searches in the LU change table (125/135) so as to decide a new disk storage access path (step 606).

The LU change controller (123/135) then sends an access request to the DKC corresponding to the decided access path (step 608).

Figure 7:
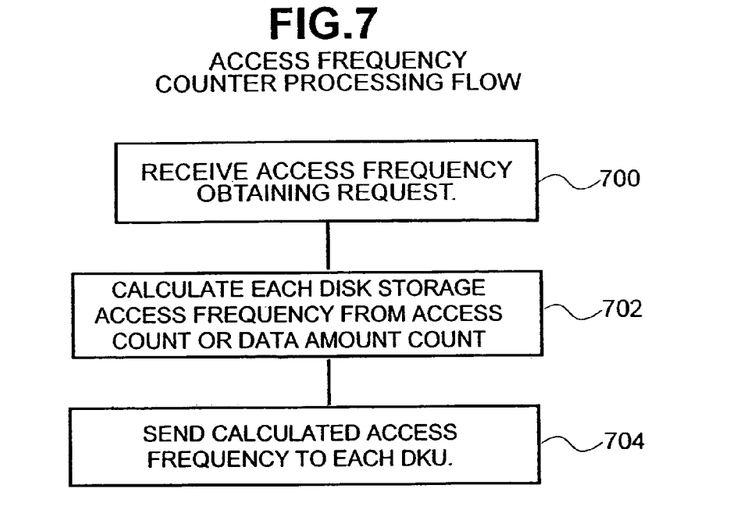
FIG. 7 is a flowchart of the processings executed in an access frequency measurement unit of the present invention.

FIG. 7 shows a flowchart of the processings executed by the access frequency measurement unit.

The access frequency measurement unit (124/134), when receiving an access frequency obtaining request (step 700), calculates an access frequency from each disk storage access count or the accessed data amount count of each disk storage (step 702) and sends the calculated access frequency to the request source (step 704).

Figure 8:
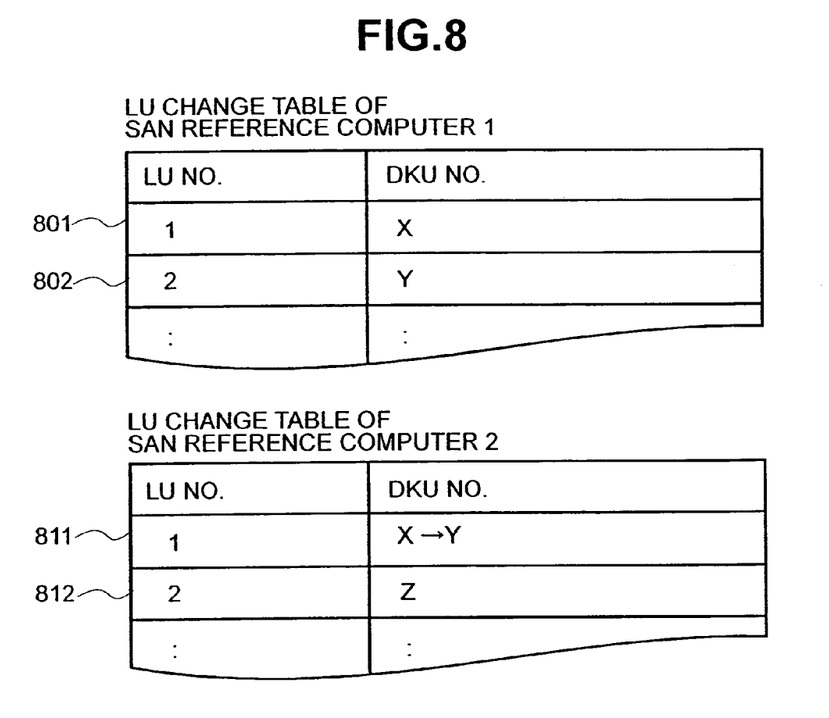
FIG. 8 is an example of the format of the LU change table of a computer that accesses the SAN according to the present invention.

FIG. 8 shows a format of the LU change table (125/135).

An LU change table is a table defining correspondence between each LU number accessed by an application program and a DKU number, which denotes a target disk storage.

In the initial state, the LU change table of the SAN reference computer 1 defines X as the DKU number corresponding to the LU number 1 (row 801) and Y as the DKU number corresponding to the LU number 2 (row 802).

The LU change table of the SAN reference computer 2 defines X as the DKU number corresponding to the LU number 1, but the DKU number is changed from X to Y when an access frequency for volume copying exceeds a predetermined high threshold value (row 811).

The DKU number corresponding to the LU number 2 (row 812) is Z.

Figure 9:
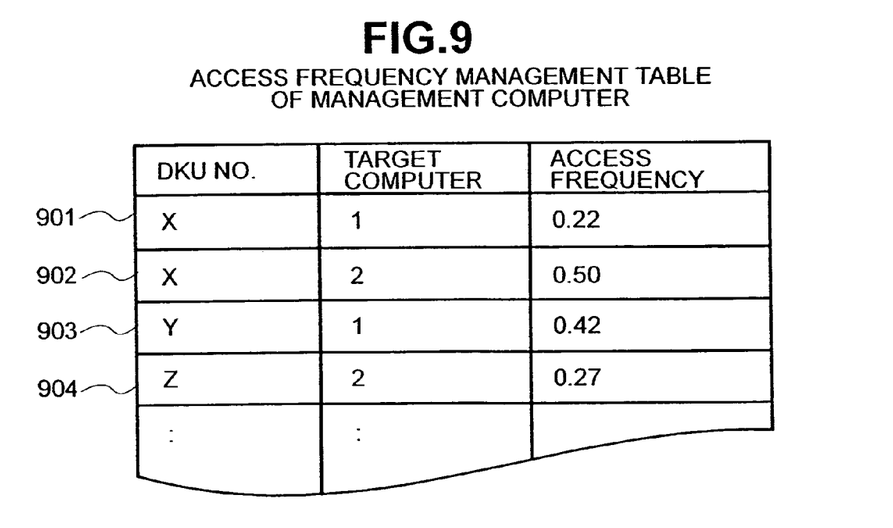
FIG. 9 is an example of the format of the access frequency management table of a management computer according to the present invention.

FIG. 9 shows a format of the access frequency management table (103).

The access frequency management table is used to manage access frequency data collected from SAN disk storages of each computer.

For example, the access frequency management table manages the access frequency of the disk storage with DKU number X, which is obtained from the SAN reference computer 1 (row 901), as well as the access frequency of another disk storage with DKU number X, which is obtained from the SAN reference computer 2 (row 902).

Figure 10:
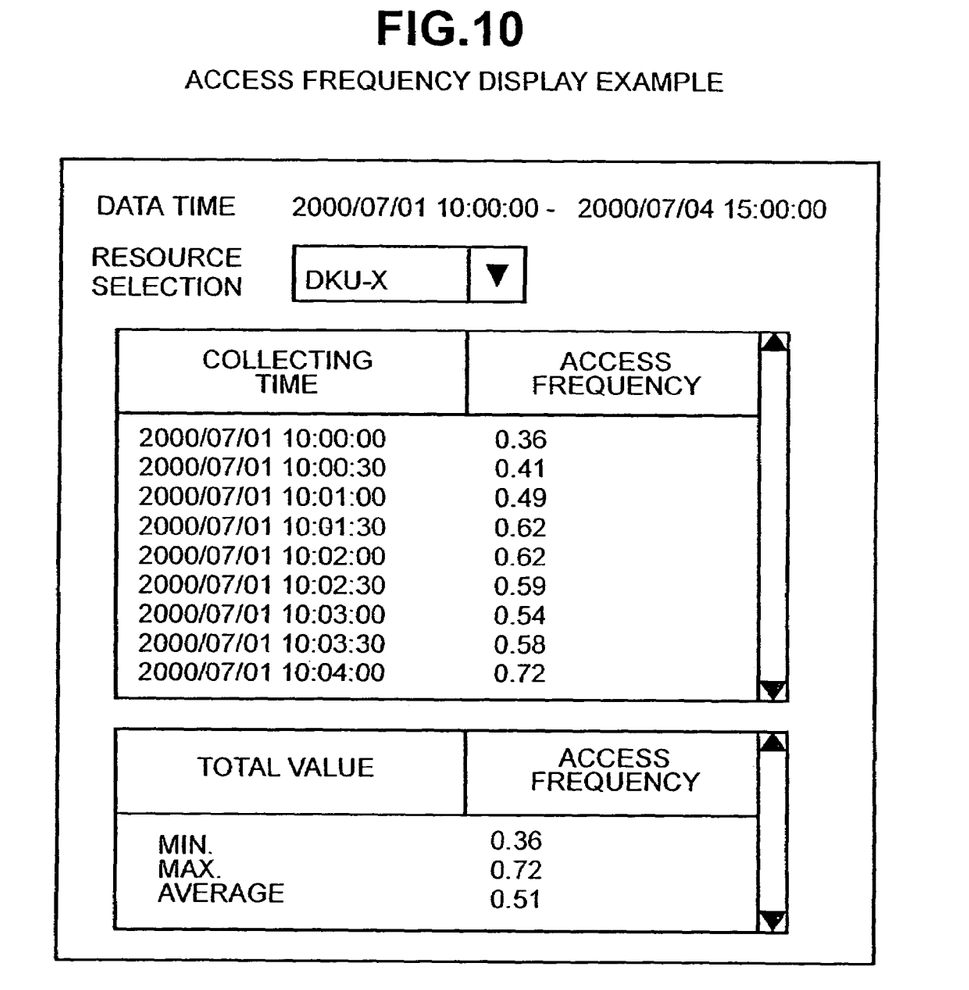
FIG. 10 is an example of the screen for displaying an access frequency totaled by the management computer according to the present invention.

FIG. 10 shows an example of access frequencies displayed on a screen.

The access frequency data managed as shown in FIG. 9 and displayed in FIG. 10 is totaled for each disk storage.

The access frequency of each disk storage is displayed with respect to each data collecting time.

The screen in FIG. 10 also shows the minimum value, the maximum value, and the average value of each collected access frequency data.

While one embodiment of the present invention has been described, the DKU controller 111 in the SAN management computer 110 shown in FIG. 1 may also be moved into a management computer 100 as a component in another embodiment thereof.

Furthermore, instead of the management computer and the SAN management computer shown in FIG. 1, the system may be provided with just one module that includes the SAN controller, the resource monitoring/management unit, and the access frequency management table that are all included in the management computer, as well as the DKU controller that is included in the SAN management computer.

The above module may be provided only in one of a plurality of the SAN reference computers.

According to the present invention, therefore, it is possible to disperse the load of each disk storage accessed from a plurality of computers so as to cope with changes of the load flexibly.

What is claimed is:

1. An information processing system comprising:
   a plurality of disk storages;
   a plurality of computers that access said plurality of disk storages; and
   a management computer;
   wherein each of the computers has a controller which counts a frequency of access to each of the disk storages and which, upon receiving an access path change command to change access paths for the computer, accesses a different disk storage according to the access path change command; and
   wherein the management computer has a controller which collects and totals a frequency of accesses to each disk storage, as counted by the controller of each of the computers, instructs one of the disk storages as a copy source disk storage to copy content in the copy source disk storage into one or more other disk storages as one or more target disk storages when the totaled access frequency is higher than a predetermined value, and instructs the controller of the computer that accesses the copy source disk storage, after receiving a report of copy completion, to change access paths so as to access a target disk storage instead of the copy source disk storage.

2. The information processing system according to the claim 1, wherein the controller of the management computer, when instructing a computer that accesses the copy source disk storage to change access paths so as to access a target disk storage from the copy source disk storage, issues an access path change command to a computer that has accessed the copy source disk storage most frequently.

3. The information processing system according to the claim 1, wherein the controller of the management computer, when data in the copy source disk storage is updated, enables the updated data to be copied from the copy source disk storage into the one or more target disk storages.

4. The information processing system according to claim 1, wherein the controller in each of the computers that refer to the disk storages receives an access path change command from the management computer to change access paths and accesses a target disk storage according to the command.

5. An information processing system comprising:
   a plurality of disk storages;
   a plurality of computers that access said plurality of disk storages;
   a first management computer; and
   a second management computer;
   wherein each of the computers has a controller which counts a frequency of access to each of the disk storages;
   wherein the first management computer has a controller which collects and totals a frequency of accesses to each disk storage, as counted by the controller of each the computers, sends a copy command to the second management computer so as to copy the data from a particular disk storage as a copy source disk storage into one or more other disk storages as one or more target disk storages when the totaled access frequency is higher than a predetermined value,
   wherein the second management computer has a controller which instructs the copy source disk storage to copy data in the copy source disk storage into the one or more target disk storages when receiving the copy command; and
   wherein the first management computer has a controller which instructs a computer that accesses the copy source disk storage to change access paths so as to access a target disk storage instead of the copy source disk storage when receiving a report from the second management computer on completion of copying the data into the one or more target disk storages.

6. The information processing system according to claim 5, wherein the controller of the first management computer, when instructing a computer that accesses the copy source disk storage to change access paths so as to access a target disk storage instead of the copy source disk storage, sends the command to a computer that has accessed the copy source disk storage most frequently.

7. The information processing system according to claim 5, wherein the controller of the second management computer, when data in the copy source disk storage is updated, enables the data to be copied from the copy source disk storage into the one or more target disk storages.

8. The information processing system according to claim 5, wherein the controller each of the computers that refer to the disk storages receives an access path change command from the first management computer to change access paths and accesses a target disk storage according to the command.

* * * * *